United States Patent [19]
Wilhelm et al.

[11] Patent Number: 4,991,078
[45] Date of Patent: Feb. 5, 1991

[54] APPARATUS AND METHOD FOR A PIPELINED CENTRAL PROCESSING UNIT IN A DATA PROCESSING SYSTEM

[75] Inventors: Neil C. Wilhelm, Menlo Park, Calif.; Judson S. Leonard, Waban, Mass.

[73] Assignee: Digital Equipment Corporation, Maynard, Mass.

[21] Appl. No.: 101,983

[22] Filed: Sep. 29, 1987

[51] Int. Cl.⁵ .............................................. G06F 09/38
[52] U.S. Cl. .................................. 364/200; 364/231.8; 364/243.41; 364/243.44
[58] Field of Search .................... 364/200, 900 MS

[56] References Cited

U.S. PATENT DOCUMENTS

| | | | |
|---|---|---|---|
| 3,728,692 | 4/1973 | Fennel, Jr. .................... | 364/200 |
| 3,787,673 | 1/1974 | Watson ......................... | 364/200 |
| 3,793,631 | 2/1974 | Silverstein et al. ............ | 364/200 |
| 3,840,861 | 10/1974 | Amdahl et al. ................. | 364/200 |
| 4,107,773 | 8/1978 | Gilbreath et al. .............. | 364/200 |
| 4,200,927 | 4/1980 | Hughes et al. ................. | 364/200 |
| 4,305,124 | 12/1981 | Marro et al. .................. | 364/200 |
| 4,314,333 | 2/1982 | Shibayama et al. ............. | 364/200 |
| 4,354,225 | 10/1982 | Frieder et al. ................ | 364/200 |
| 4,426,681 | 1/1984 | Bacot et al. .................. | 364/200 |
| 4,521,851 | 6/1985 | Trubisky et al. ............... | 364/200 |
| 4,542,453 | 9/1985 | Patrick et al. ................ | 364/200 |
| 4,547,849 | 10/1985 | Louie et al. .................. | 364/200 |
| 4,573,118 | 2/1986 | Damouny et al. ................ | 364/200 |
| 4,648,034 | 3/1987 | Heninger ...................... | 364/200 |
| 4,730,249 | 3/1988 | O'Quin ........................ | 364/200 |
| 4,763,242 | 8/1988 | Lee et al. .................... | 364/200 |
| 4,766,566 | 8/1988 | Chuang ........................ | 364/900 |
| 4,811,215 | 3/1989 | Smith ......................... | 364/200 |

OTHER PUBLICATIONS

"Microprocessor Base/Displacement Addressing Instructions", by Barber, *IBM Technical Disclosure Bulletin*, vol. 27, No. 6, Nov. 1984, pp. 3539–3550.

*The Motorola MC 68000 Microprocessor Family: Assembly Language, Interface Design, and System Design*, by Harman, ©, 1985, pp. 92–95 and 288–295.

*Primary Examiner*—Lawrence E. Anderson
*Attorney, Agent, or Firm*—William W. Holloway; John G. Mesaros; Ronald E. Myrick

[57] ABSTRACT

A data processing system is described in which the available technology is used to provide high performance. The high performance is achieved by having a four-level pipeline for the central processing system, a simplified instruction set and an interface with the coprocessor unit that has a simple and efficient interface with the normal instruction execution. The apparatus implementing the central processing system is closely connected to the instruction set. A discussion of the implementation of the data processing system is provided.

30 Claims, 4 Drawing Sheets

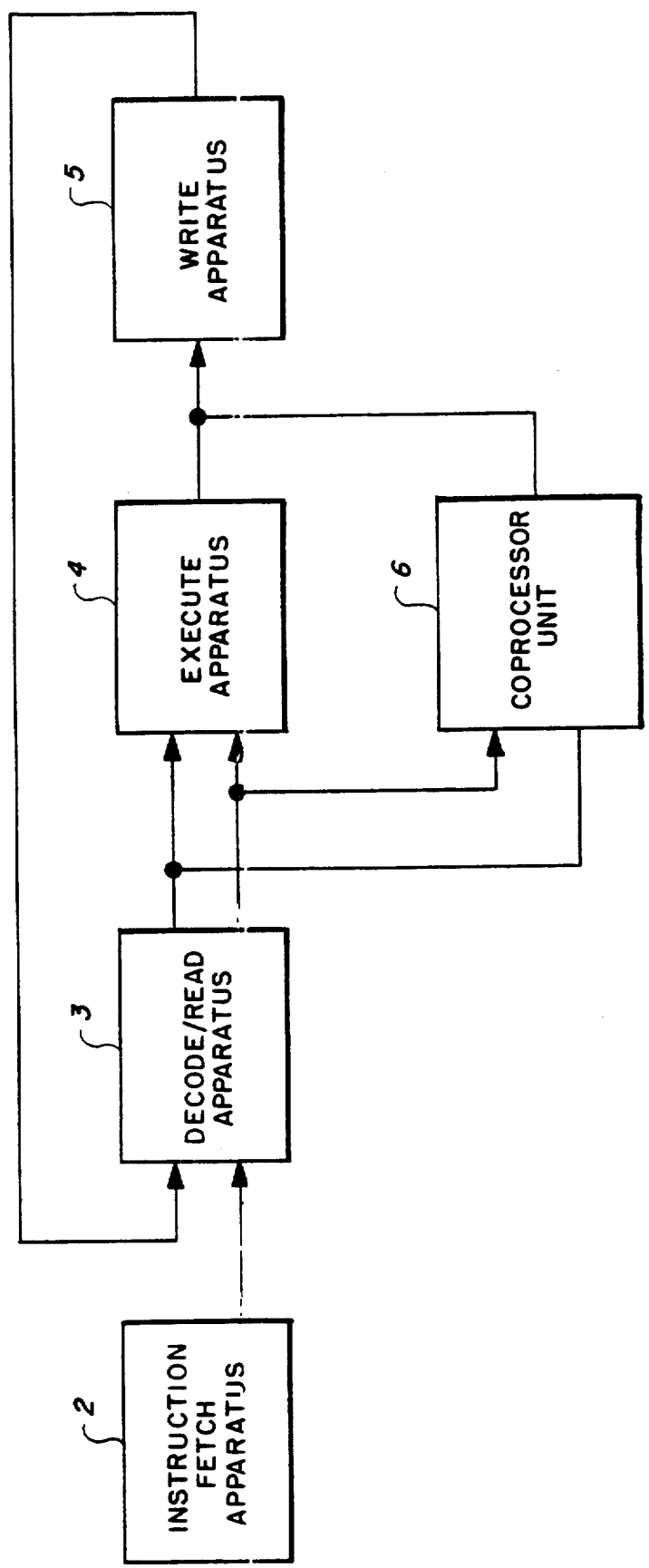
FIG. IA.

| USER AND KERNEL MODE INSTRUCTIONS | KERNEL MODE INSTRUCTIONS |
|---|---|
| LOAD | KERNEL EXIT |
| STORE | LOAD PC QUEUE |
| ARITHMETIC | FLUSH |
| EXTRACT FIELD | SPECIAL |
| SUBROUTINE JUMP | |
| CONDITIONAL JUMP | |
| LOAD ADDRESS | |
| COPROCESSOR | |
| TRAP | |

APPARATUS AND METHOD FOR A PIPELINED CENTRAL PROCESSING UNIT IN A DATA PROCESSING SYSTEM

RELATED PATENT APPLICATIONS

The following United States patent application is related to the instant application:
APPARATUS AND METHOD FOR SYNCHRONIZATION OF A COPROCESSOR UNIT IN A PIPELINED CENTRAL PROCESSING UNIT, invented by Neil C. Wilhelm and Judson Leonard, having Ser. No. 07/101,984, filed on Sept. 29, 1987 and assigned to the assignee of the present application.

BACKGROUND OF THE INVENTION

1. Field of the Invention

This invention relates generally to data processing systems and, more particularly, to high performance data processing systems that can be implemented using readily available components.

2. Description of the Related Art

As the desire for improved performance in data processing systems has increased, the design of the data processing systems has become more complex. For example, the use of a data processing system implemented using pipelined techniques has become common. In the pipeline technique, the processing function of a data processing system is divided into a multiplicity of subfunctions. The subfunctions are chosen so that each subfunction occupies a determined timing period (or cycle). The execution of an instruction involves the sequential execution of each subfunction. The execution of each subfunction is independent of the execution of the preceding or succeeding subfunction, permitting an instruction to begin and, consequently, to end during every timing cycle. The number of subfunctions into which the execution of an instruction can be divided is also the number of instructions that can be in simultaneous execution in a pipelined data processing system. Although the total time required for execution of each instruction is generally (significantly) longer than the execution of the instruction without pipeline techniques, instruction sequences can be executed more rapidly. The more rapid execution of an instruction sequence (once the pipelined data processing system has all subfunction units executing instructions) is achieved at the cost of greater complexity of the data processing system.

In addition, as data processing systems have increased in complexity, the requirement for specialized components has increased. Similarly, an attempt to improve the performance of a data processing system can frequently lead to more and more complex components. In either case of specialized components or more complex interconnection of the components, the result is increased cost of the data processing system.

The present invention is a result of a strategy to build a high performance central processing unit by attempting to keep the unit as simple as possible and by attempting to design the unit so that commercially available components, as opposed to specially designed components, can be used to implement the central processing unit. As an example, the format and the length of an instruction word must be selected and has implications throughout the architecture of the central processing unit. The size of an instruction word and the size of a data word are important in the design of a central processing unit. In particular, the instruction word frequently has been implemented by a variable length instruction word format or by parameters. Furthermore, to the extent that the instruction word has fields that have identical interpretations, the decoding apparatus for the instruction word can be simplified.

A need has therefore been felt for a high performance central processing unit that avoids many of the complexities of other high performance central processing unit and can be fabricated relatively easily.

FEATURES OF THE INVENTION

It is an object of the present invention to provide an improved central processing unit.

It is a feature of the present invention to provide a high performance central processing unit that can be implemented using available components.

It is yet another feature of the present invention to provide a high performance central processing unit having a four stage pipeline which can be implemented using available components.

It is still a further feature of the present invention to provide a high performance central processing unit having a simplified instruction set.

It is yet a further feature of the present invention to provide a pipelined central processing unit in which the address formation is performed prior to the operation execution stage.

It is still another feature of the present invention to provide a coprocessor unit to execute suboperations requiring more than one timing cycle.

It is a more particular feature of the present invention to provide apparatus for performing a hashing algorithm in conjunction with the address formation.

SUMMARY OF THE INVENTION

The aforementioned and other features, are accomplished according to the present invention, by providing a central processing unit having a four stage pipeline, operating with a load/store procedure operation, having a simplified instruction on set and providing a user and kernel mode of operation. The central processing unit has a data and instruction word size of constant (32 bit) width. The addressing technique includes a virtual addressing scheme, the virtual addressing scheme also being the mechanism for separation of the modes of operation. The address formation apparatus is associated with a relatively early pipeline stage and apparatus for performing a hashing algorithm can be provided therefore. The instruction set available to user programs includes nine instruction types, while the operating system programs can execute four additional instructions. The instructions can be grouped into three formats. Four sets of registers are available for use in the load/store procedure. A coprocessor is included to execute operations requiring more than a single timing cycle.

These and other features of the present invention will be understood by reading the following description along with the accompanying Figures.

BRIEF DESCRIPTION OF THE DRAWINGS

FIG. 1A illustrates the division of the central processing unit in a four stage pipeline implementation, while

FIG. 2A is a list of instructions showing the mode in which the instruction is permitted to operate, while FIG. 2B illustrates the instruction format according to the preferred embodiment.

DESCRIPTION OF THE PREFERRED EMBODIMENT

1. Detailed Description of the Figures

Figure 1B:
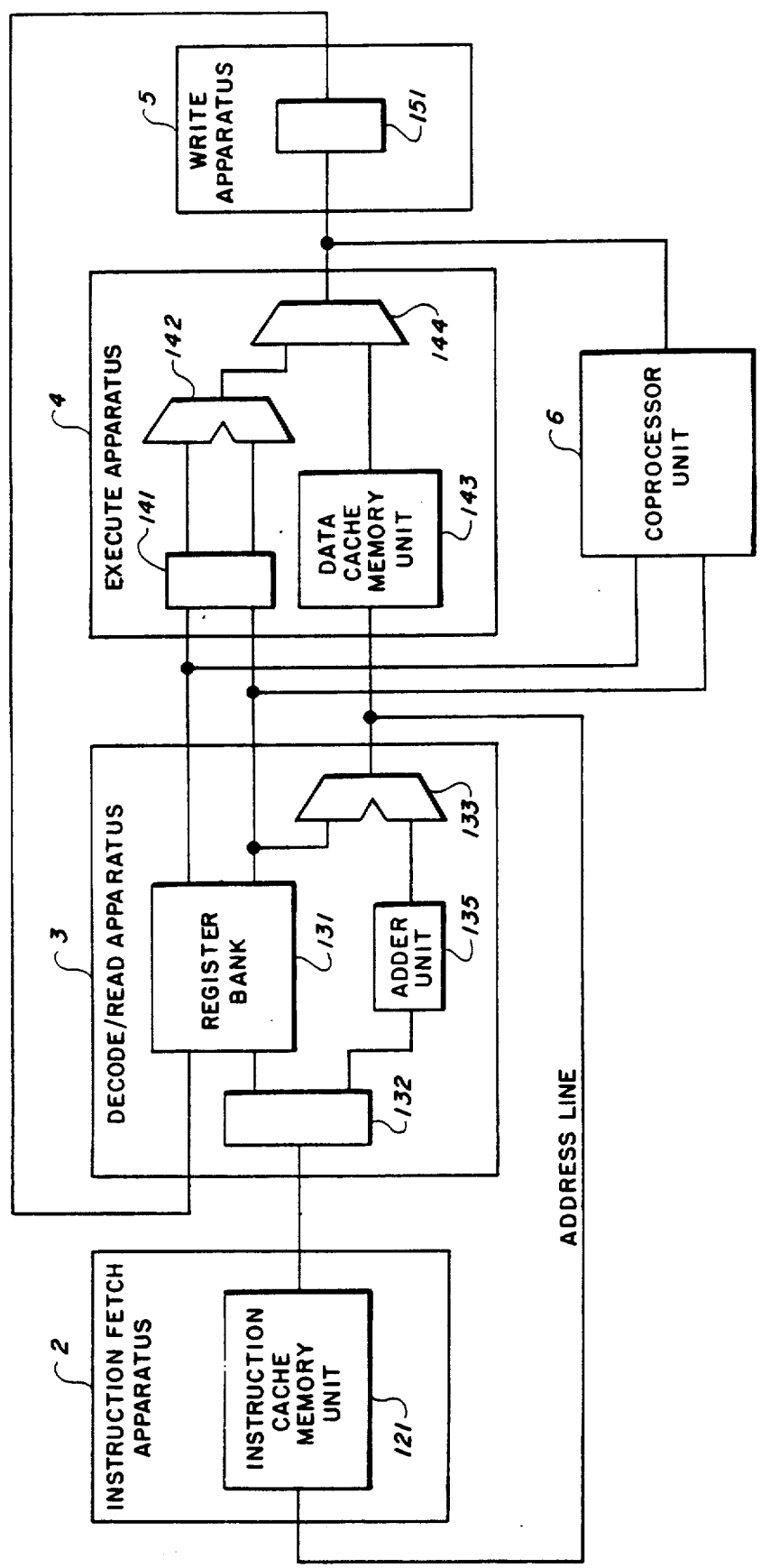
FIG. 1B illustrates the principal components of the pipeline apparatus.

Referring now to FIG. 1A, the division of the central processing unit into a multiplicity of stages is illustrated. In the preferred embodiment, the instruction fetch apparatus 2 is responsible for insuring that, to the extent possible, a continuous sequence of instructions is available for execution. The instruction fetch apparatus provides an instruction to the second stage of the central processing unit pipeline, the decode/read apparatus 3. In this apparatus, the appropriate data word(s) which are to be operated on are made available and the instruction from the instruction fetch unit is decoded to permit execution of the instruction. The operation identified by the instruction is executed in the execute apparatus 4 or in the coprocessor unit 6. The coprocessor unit 6 is a special unit for performing manipulations on the data words that require more than one cycle and, consequently must be performed out of the normal instruction pipeline sequence. The results of instruction execution by the execute apparatus 4 or the coprocessor unit 6, applied to the write apparatus 5, are entered in the decode/read apparatus 3.

Referring next to FIG. 1B, principal components of the block diagram of FIG. 1A are illustrated. The instruction fetch unit includes an instruction cache memory unit 121, the instruction cache memory unit providing the sequence of instructions being executed by the central processing unit. The next sequential instruction from cache memory unit 121 is applied to instruction register 132. Instruction register 132 has associated apparatus for decoding the instruction, i.e., providing the control signals that control the distribution and manipulation of the data (typically from two register locations). Address signals from register 132 are applied to adder unit 135, the output signals of adder unit 135 being applied to a first input terminal of arithmetic logic unit 133. Address signals from register 132 are applied to register bank 131. The data stored in two register locations in register bank 131 are applied to latch circuit 141 in the next (execute apparatus) stage of the central processing unit pipeline and to coprocessor unit 6. The data from one of the two addressed registers of register bank 131 is applied to a second set of input terminals of arithmetic logic unit 133. The output address of the arithmetic logic unit 133 is applied to the instruction cache memory unit 121 of instruction fetch apparatus 2 and to the data cache memory unit 143 of the execute apparatus 4. The contents of the latch circuit 141 are applied to two sets of input terminals of arithmetic logic unit 142. The output signals from the arithmetic logic unit 142 are applied to a first set of input terminals of multiplexer 144 while output signals of the data cache memory unit 143 are applied to a second set of input terminals of multiplexer 144. The output signals of multiplexer 144 are applied to latch circuit 151 in the write apparatus 5. The signals stored in the latch circuit 151 are applied to register bank 131 in the decode/read apparatus. The use of data cache memory unit 143 and instruction cache memory unit 121 provide the interface mechanism between the relatively slow main memory unit and the relatively rapid central processing unit. The difference in operation speeds is accommodated by transferring a multiplicity of data or instruction words as a result of a single memory reference. In addition, programs typically involve repeated use of data and/or instruction words having an address close to the referencing instruction word (i.e., the two words have a high probability of being transferred between the main memory unit and central processing unit as a result of a single memory reference).

Figures 2A, 2B:
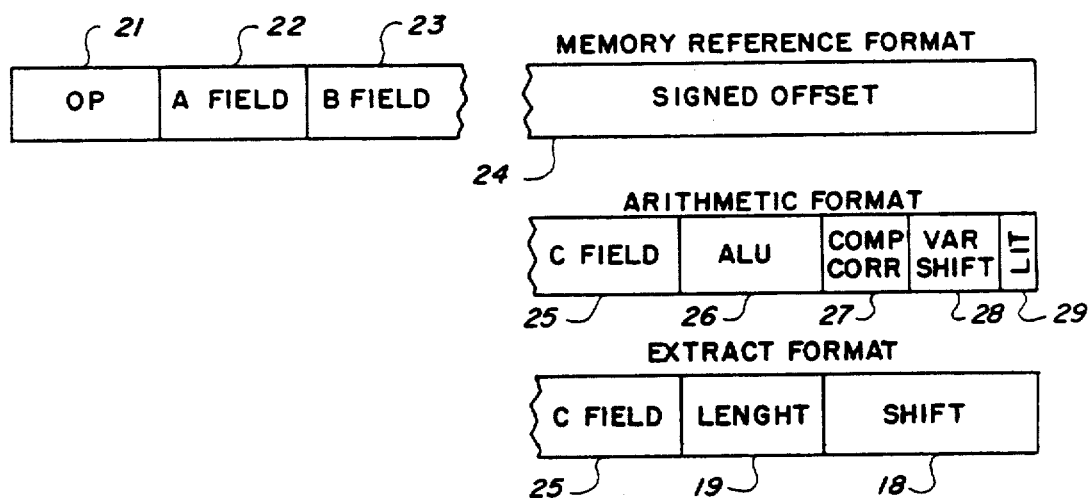

Referring next to FIG. 2A, the instruction set, to which the central processing unit of the present invention responds, is listed. The central processing unit can operate in two modes, a user mode and a kernel mode (sometimes referred to as nonprivileged and privileged modes). The instructions that can be executed in the user and in the kernel mode are the LOAD, STORE, ARITHMETIC, EXTRACT FIELD, SUBROUTINE JUMP, CONDITIONAL JUMP, LOAD ADDRESS and COPROCESSOR instructions. The KERNEL EXIT, LOAD PC QUEUE, FLUSH and SPECIAL instructions can be executed only when the central processing unit is in the kernel mode. The TRAP instruction can be executed only in the user mode. An attempt to execute a TRAP instruction in the kernel mode will cause the central processing unit to stop instruction execution. The LOAD instruction uses the memory reference format (cf. FIG. 2B) and loads the word at an address determined by the address stored in the B field register, offset by the signed field of the instruction, into the A field register. The STORE instruction also uses the memory reference format and loads the word in the A field register into the address location determined by the B field address and the offset field of the instruction. The ARITHMETIC instruction uses the three register field format (arithmetic format in FIG. 2B). The word stored in the A field register and the word stored in the B field register have the operation performed thereon determined by the ALU field in the instruction. Some operations require only a single word on which to operate. In an arithmetic operation involving a constant, the constant is placed in the A field of the instruction (constants are typically relatively small) and directly applied to the arithmetic logic unit by means of a multiplexer arrangement in the A field register path. The EXTRACT FIELD instruction uses the extract format (cf. FIG. 2B). The EXTRACT FIELD instruction concatenates the word in the A field register and the B field register and uses an instruction length field to determine the size of the field to be extracted from the concatenated field and an instruction shift field to determine amount of shift (i.e., the beginning) of the concatenated field to be stored in the C field register. This instruction can be used for shifting operations. The SUBROUTINE JUMP instruction uses the memory reference format and serves four purposes in the preferred embodiment, unconditional branching, computed branching, subroutine calls and subroutine returns. The address of the SUBROUTINE JUMP instruction is saved in the A field register, a branch is executed to an address determined by the B field register, and the instruction offset field. The CONDITIONAL JUMP instruction uses the memory reference format wherein the contents of the A field register is the quantity to be tested, the B field is the test condition and the offset value is combined with a predetermined register word (the program counter register is used in the preferred embodiment). The LOAD ADDRESS instruction uses the memory reference format, stores the computed address in the A field register. The COPROCESSOR instruction is described with reference to the coprocessor unit and uses an (interpreted) arithmetic format. The TRAP instruction uses the arithmetic format and provides the means for leaving the user mode of operation and entering the kernel mode of operation. The KERNEL EXIT instruction provides the mechanism by which the operating system program can return control of the central processing unit to a user program. When the central processing unit is entering the user mode from the kernel mode, several activities must take place such as changing the kernel mode bit in the status register. The KERNEL EXIT instruction is executed twice (because of the delayed branch implementation of the pipeline) to insure that the interrupted program is reentered at the appropriate instruction. The LOAD PC QUEUE instruction permits a user program to be entered from the operating system that is different from the previously executing program. To accomplish this change, the program counter must have the appropriate addresses entered therein. The FLUSH instruction invalidates data and instruction cache memory pages. However, if the data words in the data cache memory unit have been changed, these changed entries must be stored at the corresponding locations in the main memory unit. The SPECIAL instruction performs operating system activity for which no other instruction is appropriate. For example, these instructions control input/output and memory controller operations, setting and reading the status register, etc.

Referring next to FIG. 2B, the format of the instruction set of FIG. 2A is illustrated. Common to all instructions are a operation (OP) field 21, an A field 22 and a B field 23, where the A and B fields designating registers. When the instruction refers to a main memory location, the remaining field is a signed offset field 24. In a non-virtual memory mode, the register defined by the A field 22 is the location of the data, while the data (i.e., address) stored in the register defined by the B field 23 is combined with the data in the signed offset field 24 to identify a main memory location. In the extract instruction format, the subfield that is to be extracted is a concatenation of the data in the register determined by the A Field and the data in the register determined by the B field. The remainder of the abstract format is divided into a length field 19 and a shift field 18.

Figure 3A:
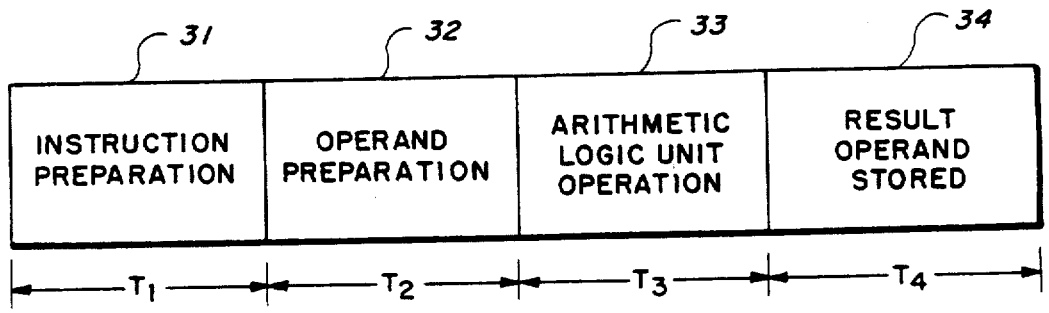
FIG. 3A and FIG. 3B compare the operation of a central processing unit pipeline for a typical instruction with a coprocessor instruction.
Figure 3B:
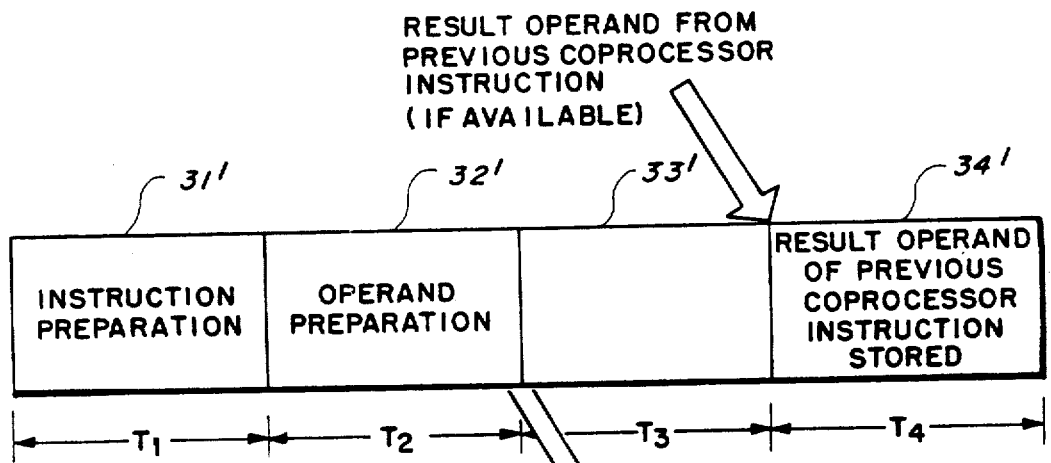

Referring next to FIG. 3A and FIG. 3B, the operation of the central processing unit pipeline for a typical arithmetic instruction (FIG. 3A) is compared with the operation of the central processing unit pipeline for a coprocessor instructor (FIG. 3B). During the first time interval T1, the central processing unit performs the instruction preparation 31 for the instruction in instruction fetch apparatus 2. In time interval 12, operand preparation 32 is performed in the decode/read apparatus 3. The arithmetic or logic operation indicated by the instruction is performed in time interval T3. Finally, in time interval T4, the write apparatus 5 stores the result operand 34 resulting from the arithmetic or logic operation in the appropriate register. When a coprocessor instruction is to be executed, the activity of the central processing unit of instruction preparation 31' and operand preparation 32' during time intervals T1 and T2, respectively, is similar to the operation for the typical arithmetic instruction. However, during time interval T3, the operands are applied to the coprocessor unit for manipulation in a manner determined by the instruction. During time interval T3, the results of the coprocessor activity from the previous coprocessor instruction are applied to write apparatus 5 and in time interval T4, the write apparatus 5 stores the result operand from the previous coprocessor instruction in the register location indicated by the C field (cf. FIG. 2B). Not shown in FIG. 1A and FIG. 1B are signal paths between stages. As will be clear to those skilled in the art of central processing units implemented in pipeline stages, these signal paths accommodate special situations such as making the result operands from the arithmetic logic unit available at an earlier timing cycle than would be possible in the normal sequence of operations of the pipeline stages.

Figure 4:
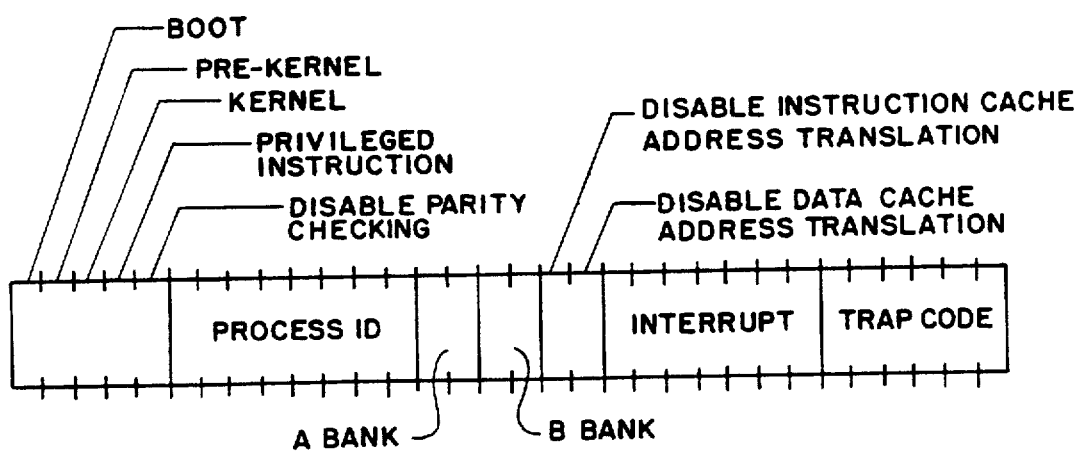
FIG. 4 illustrates the fields of the status register according to the preferred embodiment.

Referring next to FIG. 4, the fields of the status register are shown. The first bit position is the boot bit. The boot bit is forwarded to the main memory unit during the bootstrapping (initialization) procedure in order that the main memory unit will utilize instructions from associated R(ead)O(nly)M(emory) units. The pre-kernel bit is used in switching from the kernel mode of operation to the user mode of operation (i.e., in the KERNEL EXIT instruction. The privilege instruction bit permits a user program to execute privileged instructions, but is not used in the preferred embodiment. The disable parity checking is set during initialization, the initialization procedure being responsible for the data integrity. The next eight bits of the status register provide the identification of the current process. The A bank bits and the B bank bits permit the selection of 4 register banks for use by each field (the C field using the same registers as the A field). An identification of an interrupt is provided by seven bit positions. When a trap instruction, indicating the transfer from the user mode of operation into the kernel mode of operation, is identified, the address translation in the cache memory units are disabled by storing signals in associated bit positions. Six bit positions provide a trap code.

As will be clear to those skilled in the art, FIG. 1A and FIG. 1B illustrate the principal instruction and data word flow paths of the central processing unit, but do not illustrate all apparatus or signal paths typically present in the stages of the central processing unit. The apparatus not illustrated can be implemented by techniques known in the related art. For example, the instruction fetch apparatus 2 also includes an instruction counter for selecting the next instruction in the instruction cache memory unit. Similarly, associated with decode/read apparatus 3, a plurality of control circuits are coupled to register 132. These control circuits decode the logic signals stored in register 132 and distribute these signals, with appropriate delays for later pipeline stages, the registers, gates and components engaged in the manipulation of the data information.

2. Operation of the Preferred Embodiment

The central processing unit of the preferred embodiment was designed with simplicity and ease of implementation as goals. These goals resulted in the selection of certain important parameters. For example, the instruction and the data words were selected to have 32 bit positions. The use of an instruction word of this length permitted all the fields of each instruction of the selected instruction set to be included in a single word. The use of data and instruction words having a constant size simplifies the implementation of the data paths over which data and instruction words are transferred. A simplified instruction set was selected. Such an instruction set selection reduces the complexity of the decode apparatus present, but not shown in FIG. 1B. The central processing unit of the present invention was provided with a load/store implementation in which an arithmetic operation is performed on the contents of a register and returned to a register after the operation has been executed.

In addition, the central processing unit includes a virtual addressing scheme. The address translation is performed in the arithmetic unit 133. The virtual addressing process is also the point at which protection schemes between modes of operation of the central processing unit, between programs being executed by the central processing unit and between various classes of data, are provided. Two features have been added to the central processing unit to reduce the activity in the data cache memory unit. First, the P(rocess)ID(entifier) is associated with each program and eliminates the need for flushing (invalidating) the contents of the data cache memory unit when a different program begins execution. Second, a hashing procedure is added to the address formation process. A hashing procedure is a way of changing an address in a predetermined manner to randomize the resulting numbers. If the data cache memory unit addresses are not randomized, then small programs can frequently require frequent swapping between the main memory unit and the data cache memory unit because of conflicting addresses. In the preferred embodiment shown in FIG. 1B, the position of the arithmetic logic unit 133 in the decode/read apparatus places severe timing constraints on the activity that can be performed. For example, register 132 addresses register bank 131 during address formation, to retrieve the base address and apply this address to one set of input terminals of arithmetic logic unit 133. In addition, hashing algorithm implementations typically involve the use of 'exclusive or' logic gates, the 'exclusive or' logic gates providing an operation that is not associative with addition. In the present invention, the hashing algorithm is implemented with an adder unit. The adder unit 135 operates on the PIN and displacement fields that are available from the instruction and do not have to be retrieved from the register bank 131. Furthermore, by implementing the hashing algorithm with addition operations, the hashing operation commutes and associates with the the addition operation in the address formation. Therefore, the hashing operation of the present invention can be performed prior to the address formation operation.

Referring once again to FIG. 1, the four stage pipeline was chosen as a compromise between the desire for higher performance (i.e., by reducing cycle time) and the desire to reduce the latency of a branch instruction (i.e., the number of cycles from the issuance of a branch instruction until the issuance of the target instruction). In order to improve the performance of the central processing unit, instructions entering the pipeline during latent cycles (typically referred to as delay slots) are to be executed, an operation technique referred to as delayed branching. By placing the arithmetic logic unit 133 in the decode/read apparatus 3 to compute addresses, the instruction sequence is delayed by only one timing cycle for branch instructions. In addition, the arithmetic logic unit contributes to the short pipeline implementation by generating the addresses in main memory for the LOAD instruction or for the STORE instruction sufficiently early in the instruction execution to permit the data cache memory unit to operate as part of the execute apparatus 3.

The central processing unit includes both a data cache memory unit 143 and an instruction cache memory unit 121. Although the two cache memory units increase the amount of apparatus, potential conflicts that can arise with the use of a single cache are avoided. The central processing unit does not include prefetch apparatus thereby reducing the complexity apparatus implementing the central processing unit still further.

In the preferred embodiment, the register bank 131 associated with the execute apparatus 4 has four separately addressable banks of registers. These register banks can be assigned to individual processes. Some register to register transfers can be avoided thereby.

Instruction Execution Modes

In order to prevent compromise of the operation of the central processing unit, two modes of operation are available. The user mode permits a repertoire of instructions by the user of the central processing unit to have sufficient access to the resources of the data processing system to accomplish the desired manipulation of data. The kernel mode provides to the operating system additional instructions (indeed all possible instructions except the TRAP instruction) to respond to exceptional situations and to control functions in the central processing unit to which access by a user program could result in erroneous processing. In the preferred embodiment, the operating system is responsible for maintenance and interpretations of page tables, as well as control of entries in the translation table cache memory unit. The operating system is also responsible for input/output operations. Similarly, interrupt events occurring during a user program are responded to by the operating system. In order to simplify the design of the central processing unit by avoiding use of an interrupt stack, external interrupts are disabled during operation in the kernel mode. The operating system is also responsible for the virtual memory address mechanism. Included in the virtual memory address mechanism is a mechanism for preventing interaction of the user programs with each other and with the operating system and provides a mechanism for relocating or rearranging the data and instruction word groups (pages) in main memory.

Coprocessor Unit

The coprocessor unit is used to perform operations on data words that can not be accommodated within the timing cycle of the central processing unit pipeline stages. Integer multiplication and integer division are examples of such operations, the plurality of steps implementing these operations can not be accommodated in the timing cycle available for each stage. In addition, atypical operations that are too complex to be performed in a single machine cycle involve quantities represented by the floating point format (i.e., are represented by a normalized fraction value and an exponent value) and by quantities represented in a double precision format (i.e., wherein two data words are used to represent the quantity). To minimize the interruption to the sequential instruction execution, the coprocessor activity is performed in parallel with the execution of the typical arithmetic instructions, permitting the central processing unit to continue instruction execution. In the preferred embodiment, the instruction indicating coprocessor unit operation and the instruction indicating arithmetic logic unit operation have generally the same format, the most significant difference being the interpretation of the C field as the destination register of a result operand currently available in the (accumulator register of) coprocessor unit. In the preferred embodiment, when the result operand to be transferred to the destination register is not (yet) available, the central processing unit suspends operation until the result operand is available.

Pipeline Stalls

In an ideal central processing unit pipeline environment, each of the stages of the pipeline operate independently. However, when a data word is not in the cache memory unit, the retrieval of the data from the main memory unit can require several cycles. In addition, a number of situations can arise in the pipeline environment in which execution of a first instruction can impact the execution of a second instruction. The dependencies between pipeline stages can be accommodated by judicious programming (e.g., insertion of no op instructions). Similarly, a compiler can be developed to insert useful instructions between instructions that can interact. In the central processing unit of the preferred embodiments, the interactions between stages are accommodated by pipeline interlock mechanisms that temporarily suspend or stall the operation of the pipeline. This mechanism is equivalent to the insertion of no op instructions in the program, but relieves the programmer of the responsibility for insertion of the commands. In the preferred embodiment of the central processing unit, three situations arise that are resolved by stalling the operation of the pipeline, address stalls, store stalls and coprocessor stalls.

With respect to the address stalls, these stalls arise because the address formation requires substantially an entire machine cycle to complete. When the result of a calculation in arithmetic logic unit 142 (in the execute apparatus) is to be used immediately in the execution of a load, store or branch operation, the address arithmetic logic unit needs the input values too early to benefit from a feedback stage that can directly couple output signals from the execute apparatus 4 to an input terminal of the decode/read apparatus 3. The pipeline mechanism is therefore stalled one cycle, permitting the result of the execute apparatus 4 to be entered in the write apparatus 5, the data thereby being available to the decode/read apparatus 3.

The store operation stalls in the central processing unit of the preferred embodiment arise because the data cache memory unit 143 can not complete a write operation in a single cycle. The first cycle is used to insure that the corresponding address has valid data stored therein and the second cycle is used for actual storage of the operand. The hardware stall mechanism insures that a store operation is not immediately followed by a load or a store operation.

The coprocessor stall operation is activated when a result operand from the coprocessor is not available when a subsequent coprocessor instruction is issued. The coprocessor stall, although not so named, has been discussed with respect to the coprocessor instruction.

Status Register

The contents of the status register are changed only by detection of an interrupt event or by instructions reserved for the operating system. In the preferred embodiment, a condition code field is not provided in the status register because of the complexity involved. For example, a conditional branch must immediately follow the condition that is being tested. In addition, condition codes can vary with instructions.

Interrupt Handling

Events which provide an interrupt response are handled in the kernel mode of operation. To reduce complexity, an interrupt stack has not been provided and, consequently, external interrupts are disabled in the kernel mode. Only that information required to continue the currently executing program at the point of interruption is saved. In addition, complex procedures for restarting a program are not provided. Interrupt events, such as the attempt by a user program to execute an instruction reserved for the kernel mode, result in transfer to the kernel mode to attempt to recover from the event. However, an interrupt event in the kernel mode typically result in cessation of the operation of the central processing unit.

Central processing Unit Implementation

The central processing unit of the present invention was implemented using the commercially available ECL (emitter-coupled logic) 100K family SSI (small scale integration:gates) components and MSI (medium scale integration:adders) components manufactured by the Fairchild Corporation. The simple design of the central processing unit minimizes the advantage of using denser component packages, while the simpler circuit paths are consistent with the use of MSI components. (Instrumental in the selection of the 100K family of components was the presence of temperature compensation of the components as well as voltage compensation. In addition, the 100K family of components are fabricated with a standard 24 pin dual-in-line package.) Selection of a sub-set of the 100K family of components further enhanced the simplicity of the design. To increase the integrity of data transfer, the transmission lines were fabricated (and the 100K family of components was designed to drive transmission lines) with a 50 Ohm characteristic impedance and the transmission lines were terminated with a 50 Ohm impedance. A single phase clocking system was used in the data processing system. The ECL 100K family of components has an additional feature that is important in the maintenance of the central processing unit. The ECL 100K components can be configured to shift the logic signals stored therein out of the component. The shifted signals can be analyzed, in the event of a malfunction and an identification of the condition causing the malfunction attempted. (This type of configuration can be used to place the central processing unit in a preselected state.) The central processing unit of the preferred embodiment has 45 ns (nanosecond) cycle and can achieve an average performance of 15 mips (million instructions per second). The arithmetic logic units are implemented by 100181 integrated circuits.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the present invention.

What is claimed is:

1. A central processing unit of a data processing system, said central processing unit comprising:
   instruction cache memory unit for storing sequences of instructions;
   decode/read means coupled to said instruction cache memory unit, said decode/read means including;
   an instruction register for receiving instructions from said instruction cache memory unit,
   an operand register bank for storing operands and for retrieving operands in response to address portions from said instruction register,
   an adder unit for receiving address portions from said instruction register, and
   a first arithmetic logic unit for receiving signal groups from said operand register bank unit and said adder unit, said arithmetic logic unit providing addresses, wherein said addresses are applied to said instruction cache memory unit, said instruction cache memory unit providing a next sequential instruction of a currently executing sequence of instructions from said instruction cache memory unit to said instruction register during a first time period, said instruction register providing control signals determining a distribution and a processing of at least one data operand according to said next sequential instruction, said operand register bank providing operands in response to address portions from said instruction register and said first arithmetic logic unit providing addresses during a second time period;
   execute means including;
   a latch circuit for storing at least one operand from said operand register bank,
   a second arithmetic logic unit receiving said at least one operand from said latch circuit, said second arithmetic logic unit providing a processed operand,
   a data cache memory unit providing an operand in response to addresses from said first arithmetic logic unit, and
   multiplexer unit for receiving a processed operand from said second arithmetic logic unit and a stored operand from said data cache memory unit, said second arithmetic logic unit processing said at least one data operand in accordance with control signals from said instruction register or said data cache memory unit retrieving one stored operand during a third time period; and
   write means for transferring a processed data operand resulting from said processing said at least one data operand or a stored operand from said data cache memory unit to a designated location in said operand register bank in response to control signals from said instruction register during a fourth time period; wherein said instruction cache memory unit, said decode/read means, said execute means and said write means are pipeline subsystems of said central processing unit, said central processing unit using a load/store operational procedure.

2. The central processing unit of claim 1 wherein said operand register bank includes four separately accessible sets of registers selectable by a currently executing user program, said register bank storing data operands to be processed.

3. The central processing unit of claim 1 wherein said adder unit and said arithmetic logic unit forming an address using a predetermined procedure in response to an instruction in said instruction register, wherein said predetermined procedure for forming an address to be applied to said data cache memory can include virtual address to real address translation.

4. The central processing unit of claim 3 wherein said predetermined procedure for providing an address includes a hashing procedure for minimizing address clustering, said hashing procedure being implemented using said adder unit.

5. The central processing unit of claim 4 wherein said hashing procedure is performed prior to an address formation procedure.

6. The central processing unit of claim 4 wherein said central processing unit ceases operation when an operand required for executing said sequence of instructions is not available to said central processing unit subsystems when required for said executing said sequence of instructions, and wherein said central processing unit resumes operation when an operand required for executing said sequence of instruction is available.

7. The central processing unit of claim 6 wherein prefetch apparatus is replaced by a transfer of large groups of operands for each main memory access.

8. The central processing unit of claim 1 wherein said central processing unit is responsive to a LOAD instruction, said LOAD instruction transferring an operand from a first location in said data cache memory unit to a first location in said operand register bank.

9. The central processing unit of claim 8 wherein said central processing unit is responsive to a STORE instruction, said STORE instruction transferring an operand at a second location in said operand register bank to a second location in said data cache memory unit.

10. The central processing unit of claim 9 wherein said central processing unit is responsive to an ARITHMETIC instruction, said ARITHMETIC instruction performing a predetermined arithmetic/logic operation on an operand in a third location in said operand register bank, said predetermined arithmetic/logic operation including a second operand selected from the group consisting of an operand in a fourth location in said operand register bank and a constant operand identified by said ARITHMETIC instruction.

11. The central processing unit of claim 1 wherein said central processing unit has a kernel mode and a user mode for executing instructions, said kernel mode of operation permitting execution of instructions not executable in said user mode, said user mode of operation executing instructions available to a user program for said central processing unit.

12. The central processing unit of claim 11 wherein said central processing unit operating in said user mode is able to execute all instructions selected from a group of instructions consisting of a LOAD instruction, a STORE instruction, an ARITHMETIC instruction, an EXTRACT FIELD instruction, a SUBROUTINE JUMP instruction, a CONDITIONAL JUMP instruction and a COPROCESSOR instruction.

13. The central processing unit of claim 12 wherein said central processing unit operating in said kernel mode is able to execute all instructions selected from a group of instructions consisting of a KERNEL EXIT instruction, a LOAD PC QUEUE instruction, a FLUSH instruction and SPECIAL instructions in addition to said group of instructions executable in said user mode.

14. The central processing unit of claim 12 wherein said user executable instructions include a field identifying a processing operation, a first address field identifying a first location in said operand register bank storing an operand to be processed and a second address field identifying a second location in said operand register bank into which a result operand is to be stored.

15. The central processing unit of claim 1 further including:
- coprocessor means for receiving stored operands from said operand register bank, said coprocessor means responsive to control signals from said instruction register for processing operands for which processing operations take more than one time period, said execute means processing operands and retrieving operands from said data cache memory unit during processing operations of said coprocessor means, resulting operands from said coprocessor means being applied to said write means for storing in said operand register bank.

16. The central processing unit of claim 15 wherein said central processing unit is capable of executing a COPROCESSOR instruction, said COPROCESSOR instruction being an instruction requiring for than one time period to execute, said COPROCESSOR instruction including:
- a first operand field identifying a location in said operand register bank;
- an operation field identifying a operation to be performed on data group identified by said first operand field by said coprocessor means; and
- a second operand field identifying a location in said operand register bank into which a result operand stored in said coprocessor means is to be transferred, said result operand resulting from operation of said coprocessor means in response to a previous COPROCESSOR instruction.

17. The central processing unit of claim 15 wherein a process identifier is associated with each program to eliminate cache invalidation procedures.

18. The central processing unit of claim 15 wherein all instructions and data operands in said central processing unit are represented by an identical number of logic signals.

19. The central processing unit of claim 15 wherein said adder unit and said first arithmetic logic unit can implement a virtual address to real address translation.

20. A central processing unit for use in a data processing system, said central processing unit having a pipelined implementation, said central processing unit comprising:
- first pipeline stage means including a instruction cache memory unit for storing instructions controlling processing of operands by said central processing unit;
- second pipeline stage means including a data register bank for storing data operands to be processed by said central processing unit, said second pipeline stage means including an instruction register for storing an instruction from said first pipeline stage means, said second pipeline stage further including an adder unit receiving addresses from said instruction register and a first arithmetic logic unit receiving input signals from said adder unit and from said operand register bank, said first arithmetic logic unit providing an address, wherein said address can be applied to said instruction cache memory unit in response to first signals from said instruction register;
- third pipeline stage means including a latch circuit for storing operands and a second arithmetic unit coupled to said latch circuit for processing operands stored in said latch circuit, said third pipeline stage means further including a multiplexer unit having a processed operand from said second arithmetic unit applied thereto and a data cache memory unit responsive to addresses from said first arithmetic logic unit for applying a operand to said multiplexer unit in response to second signals from said instruction register; and
- fourth pipeline stage means for transferring a processed operand from said third pipeline stage means operation to a location in said operand register bank determined by an instruction resulting in said processed operand; wherein each of said first, second, third, and fourth pipeline stage means performs an activity related to a single instruction in sequential clock periods.

21. The central processing unit of claim 20 wherein said central pipeline unit is implemented to stall when a result from a first instruction has not been completed when required by a subsequent instruction.

22. The central processing unit of claim 20 wherein a plurality of instructions are retrieved in response to an instruction fetch procedure by said first pipeline stage means, said plurality of instructions of said fetch procedure providing instruction prefetch for said central processing unit.

23. The central processing unit of claim 20 wherein said adder unit provides a hashing operation on an initial address operand prior to said preparing an address, said adder unit combining a signed operand with said initial address operand to increase a range of numerical values for said address.

24. The central processing unit of claim 20 wherein said central processing unit using a register to register mode of operation wherein an initial operand from said register bank is processed by said central processing unit and a processed operand is returned to said register bank, fields of each instruction of said central processing unit identifying at least one initial operand register bank address and a processed operand register bank address.

25. The central processing unit of claim 24 wherein said register bank includes a plurality of sets of data independently addressable registers.

26. The central processing unit of claim 20 further comprising coprocessor means in said third pipeline stage means for performing an extended processing operation on at least one input operand, wherein said extended processing operation requires more than one clock period, said coprocessor means accepting said at least one input operand from said second pipeline stage in response to third signals from a COPROCESSOR instruction in said instruction register, said coprocessor means applying a resulting operand to said fourth pipeline stage means in response to control signals from a next sequential COPROCESSOR instruction.

27. The central processing unit of claim 26 wherein a next sequential COPROCESSOR instruction halts operation when said resulting coprocessor operand is not available for processing.

28. The central processing unit of claim 20 wherein said central processing unit has a user mode of operation and a kernel mode of operation, said kernel mode of operation permitting execution of instructions not executable during said user mode of operation, said user mode of operation executing at least one instruction selected from a group of instructions consisting of a LOAD instruction, a STORE instruction, a ARITHMETIC instruction, a EXTRACT FIELD instruction, a SUBROUTINE JUMP instruction, a CONDITIONAL JUMP instruction and a COPROCESSOR instruction.

29. The central processing unit of claim 28 wherein said kernel mode of operation executes at least one instruction selected from a group of instructions consisting of a KERNEL EXIT instruction, a LOAD PC QUEUE instruction, a FLUSH instruction, and a SPECIAL instruction in addition to said group of instructions executed in said user mode.

30. The central processing unit of claim 29 wherein said group of instructions executed in said user mode further consists of a TRAP instruction, wherein said TRAP instruction is executed only in said user mode.

* * * * *